United States Patent

Minke et al.

[11] Patent Number: 5,262,108
[45] Date of Patent: Nov. 16, 1993

[54] PROCESS FOR PRODUCING MULTICOLORED SLUSH SKINS

[75] Inventors: Jürgen Minke, Lindwedel; Roland Wolff, Seelze; Axel Bruder, Burgwedel; Werner Wagner, Bad Nenndorf, all of Fed. Rep. of Germany

[73] Assignee: J. H. Benecke AG, Hanover, Fed. Rep. of Germany

[21] Appl. No.: 755,365

[22] Filed: Sep. 6, 1991

[30] Foreign Application Priority Data

Sep. 14, 1990 [DE] Fed. Rep. of Germany ....... 4029254

[51] Int. Cl.$^5$ .................. B29C 39/12; B29C 41/18; B29C 41/22
[52] U.S. Cl. .................... 264/163; 264/245; 264/246; 264/255; 264/301; 264/302; 264/310; 264/334; 264/DIG. 57; 264/DIG. 60; 264/DIG. 79
[58] Field of Search ............... 264/245-247, 264/255, 256, 301-304, 163, 248, 266, 296, 310, 311, 332, 334, 336, DIG. 57, DIG. 60, DIG. 64, DIG. 79

[56] References Cited

U.S. PATENT DOCUMENTS

| | | | |
|---|---|---|---|
| 3,300,557 | 1/1967 | Valentini | 264/245 X |
| 3,439,083 | 4/1969 | Ugolini | 264/245 X |
| 3,793,422 | 2/1974 | Johnston | 264/163 X |
| 4,304,747 | 12/1981 | Lake | 264/163 X |
| 4,562,025 | 12/1985 | Gray | 264/310 X |
| 4,650,623 | 3/1987 | Berger | 264/163 X |
| 4,780,345 | 10/1988 | Gray | 264/245 X |
| 4,880,588 | 11/1989 | Brault et al. | 264/245 X |
| 4,894,004 | 1/1990 | Brault | 264/245 X |
| 4,895,690 | 1/1990 | LaRoche et al. | 264/245 |
| 4,938,906 | 7/1990 | Brault | 264/246 X |
| 4,940,557 | 7/1990 | Kimura | 264/245 X |

FOREIGN PATENT DOCUMENTS 0162594 11/1985 European Pat. Off. .
3734311 4/1988 Fed. Rep. of Germany ...... 264/163

Primary Examiner—Karen Aftergut
Attorney, Agent, or Firm—Cushman, Darby & Cushman

[57] ABSTRACT

In the course of producing a multicolored slush skin in accordance with the powder-slush method, individual one-piece slush skins are produced in successive process steps, which extend over the entire mold, which is divided into individual color zones by means of separation fins. After the first slush skin with the first color has been produced, the area assigned to another color is cut off and this part taken out of the mold, the other part of the slush skin remaining in the mold. Subsequently a complete second slush skin is formed in the previously emptied partial area as well as in the area of the remaining first slush skin, etc. A multicolored slush skin, looking from the grain side, then is the result after it is finally taken out of the mold, which is distinguished by an exact and visually tidy separating seam between the individual color areas.

4 Claims, 2 Drawing Sheets

PROCESS FOR PRODUCING MULTICOLORED SLUSH SKINS

FIELD OF THE INVENTION

The invention relates to a process for producing multicolored slush skins (molded parts) with different color areas. In particular, the slush skins may be used for dashboards for motor vehicles, where 1) slush material (powder or paste) is placed into a mold which can be heated to a mold temperature and which determines the shape of the slush skin; 2) where the slush material is distributed and deposited on the heated mold surface by rotation of the mold and is subsequently sintered and gelled; 3) where the slush skin is removed from the mold after the mold has cooled; 4) where appropriately different slush materials are used for the respective colors of the different color zones of the slush skin; and 5) where the different color zones on the mold surface corresponding to the color zones of the slush skin are separated from each other by at least one separation fin. The invention further relates to a mold for executing the process and to a separating device for separating a slush skin extending over several color zones in the area of the separation fins.

BACKGROUND OF THE INVENTION

It is known to produce molded parts (dashboards as part of the interior fittings of motor vehicles, for example) in accordance with the powder-slush process. In this case a mold, corresponding for example to the three-dimensional shape of a dashboard, is heated and coupled together with a powder pan.

By rotating the unit formed from mold and powder pan, distribution of the PVC powder capable of forming a gel takes place, which is brought into contact with the hot mold and adheres controlling the rotation.

Following the end of rotation, i.e. after the powder has been deposited on the heated surface of the inner wall of the mold, the powder pan is separated from the mold and the phases of sintering and gelling of the powder in the mold follow.

The mold is cooled after the powder adhering to the mold has been sintered together and a slush skin has formed. The slush skin is subsequently removed from the mold.

The powder-slush process described up to this point assumes that the slush skin which was formed is of a single color, because only one particular PVC powder is used over the entire area of the mold. However, actually there is often a requirement to embody molded parts, in particular dashboards for the interior fitting of motor vehicles, in several colors, i.e. with areas of different colors. It is intended to keep the powder-slush process for doing this, since it has been generally successful in connection with the production of slush skins.

Masking techniques constitute a known possibility. If, for example, a two-colored slush skin is desired, a color zone corresponding to a first color area is covered with a mask in the mold, so that only the other color zone corresponding to the second color area is free. A part of the slush skin is then produced in this color zone using PVC powder with the desired second color.

Subsequently the opposite operation is performed, i.e. now the already produced partial slush skin in the second color zone is covered with another mask, so that the first color zone in the mold is free, where now the second part of the slush skin is produced using another PVC powder with the first color. The masks are embodied in such a way that a narrow transition area is formed between the individual color zones, so that during the production of separating seam with the previously produced first part of the slush skin, a one-piece slush skin is created.

Although the masking technique is basically usable for producing multicolored slush skins, it has been shown in actuality that the separating seam looks untidy to the eye. But it is the separating seam itself, extending between the different color areas, which is the decisive criterion for a multicolored slush skin which looks tidy to the eye.

While the parts of the slush skin with the different colors are produced at different times when using the masking technique, it is already known from EP 0 162 594 A2 to produce these color areas at the same time in one mold. For this purpose different chambers or color zones delimited by separation fins are formed in the mold, into which the diverse PVC powders with the appropriate desired colors are introduced. The separation fins are embodied such that a one-piece slush skin has been created at the end of the powder-slush process.

Although by means of this technique it is possible to shorten the amount of time for producing a multicolored slush skin, it was also found in this case that the separating seams are not tidily made, which as a result is not pleasing to the eye of the user.

Finally, it is also possible to produce the separate skin pieces of different colors separately and to combine these individual parts later into a uniform slush skin, for example by connecting the individual parts by HF welding. If the slush skin has a three-dimensional shape, however, HF welding is difficult and an untidy weld seam can appear. It is also possible to connect the individual skin parts by gluing. But this process is also complicated with three-dimensional skins and results in untidy separating seams. There is furthermore the danger that the adhesive may fail, for example if a multicolored dashboard is exposed to temperature extremes in winter and summer. In the summer the extended exposure to the rays of the sun can easily cause the adhesive to loosen.

OBJECT AND SUMMARY OF THE INVENTION

It is the object of the invention to disclose a process for the production of multicolored slush skins which assures exact and clean separating seams in the transition areas between the individual color areas. This object is attained in connection with the process for producing multicolored slush skins (molded parts) with different color areas, in particular for dashboards for motor vehicles, where slush material (powder or paste) is placed into a mold which can be heated to a mold temperature and which determines the shape of the slush skin, where the slush material is distributed and deposited on the heated mold surface by rotation of the mold and is subsequently sintered and gelled and where the slush skin is removed from the mold after the mold has cooled and where appropriately different slush materials are used for the respective colors of the different color zones of the slush skin and where the different color zones on the mold surface corresponding to the color zones of the slush skin are separated from each other by at least one separate fin of triangular shape in cross-section, having acutely tapering flanks which form a wedge angle of approximately 45°, the flanks being symmetrically inclined to the adjacent area of the mold.

The process is characterized by the following features:

a) a first slush material is placed on the entire mold face jointly in all color zones and a first slush skin with a first color is produced;

a1) the first slush skin is cut at the separation fins by moving a separating device with a heated separating cutter on and along the top edge of the separating fins;

b) the color zones which have been allocated a different color are taken out of the mold in the customary way — with the exception of the color zone with the first color — after the one-piece slush skin distributed over the entire mold face and all color zones have been separated at the separation fins delimiting the color zone with the first color from the other color zones, so that only the slush skin in the color zone(s) with the first color remains in the mold, c) a second slush material is applied on the entire form face in all color zones, i.e., also in the area of the remaining slush skin with the first color, and a slush skin with the second color is produced, d) in connection with slush skins with more than two colors further steps are taken in accordance with features b) and c), where two or more color zones or the corresponding slush skins remain in the mold, e) the slush skin with all color zones is taken out of the mold in the usual manner.

The invention takes the novel and surprising path of first producing the entire slush skin in one color in accordance with the conventional powder-slush process using a first color. However, the slush skin is initially retained in the mold, i.e. it is not taken out.

The color zones assigned to the individual color areas are formed in the mold by separation fins. In the case of a two-colored slush skin, the latter is separated along the separation fin, and the part of the slush skin which is part of the second color is removed, so that part of the mold is emptied, where the portion of the slush skin which is part of the first color remains in the mold.

In a next step the entire mold, and this means also the area in which the part of the slush skin which is part of the first color, is filled with a PVC powder of the second color. Subsequently, another one-piece slush skin is produced in the conventional way in accordance with the powder-slush process. Since in the course of this the color zone assigned to the first color is covered by the remaining partial slush skin, a one-piece slush skin with two color areas results when seen from the grain side. In practice this has resulted in the advantage that an exact and clean separating seam is achieved at the transition point from one to the other color.

Thus, with the process of the invention a uniform slush skin is always formed over the entire color area in every process step associated with a color. Although this may appear bothersome at first glance, the use of the process of the invention shows that this bother is more than compensated for by attaining clean separating seams.

It is another object of the invention to provide a mold for executing the process which makes possible the production of multicolored slush skins with clean separating seam.

For this purpose it has been provided to delimit the color zones assigned to the different color areas by separation fins.

These separation fins make it possible to separate individual areas of the slush skin initially made of one piece in order to take skin areas partially out of the mold.

In a practical embodiment of the invention the separation fins have a wedge-shaped cross section with two acutely tapering flanks. This shape of the cross section makes easy separation of individual skin areas possible by means of a separating device approximately adapted to the wedge shape.

In a further embodiment of the invention the height of the separation fins is only slightly greater than the thickness of the first produced slush skin.

The separation fins nevertheless do not hamper the formation of a uniform slush skin across the entire mold area. It is furthermore assured that afterwards individual skin areas can be easily separated along the separation fins and taken out of the mold.

Finally, the invention also relates to a separating device, and it is its object in this respect to provide a possibility of separating desired skin sections cleanly and simply along the separation fins from the initially one-piece slush skin.

The separating device has a heatable separating cutter for this purpose.

By means of this heatable separating cutter, guided along the separation fins by the separating device, the slush skin is heated in the area of the separation fins. Because of this and the mechanical friction movement on the separation fin, it is possible to separate individual skin areas cleanly.

Where its outside extends in an arc, the separating cutter preferably has a guide groove, the cross-sectional shape of which is adapted to the cross section of the separation fins.

Guidance of the separating device along the separation fins becomes particularly secure because of this, so that a clean cut or a clean separating seam is created which also exactly corresponds to the course of the separation fin.

Further practical embodiments and improvements of the invention ensue from the dependent claims and from the description and the drawings.

For better understanding, the invention will be described in detail below by means of the exemplary embodiment illustrated in the drawings.

DETAILED DESCRIPTION OF THE PREFERRED EMBODIMENT

Figure 1:
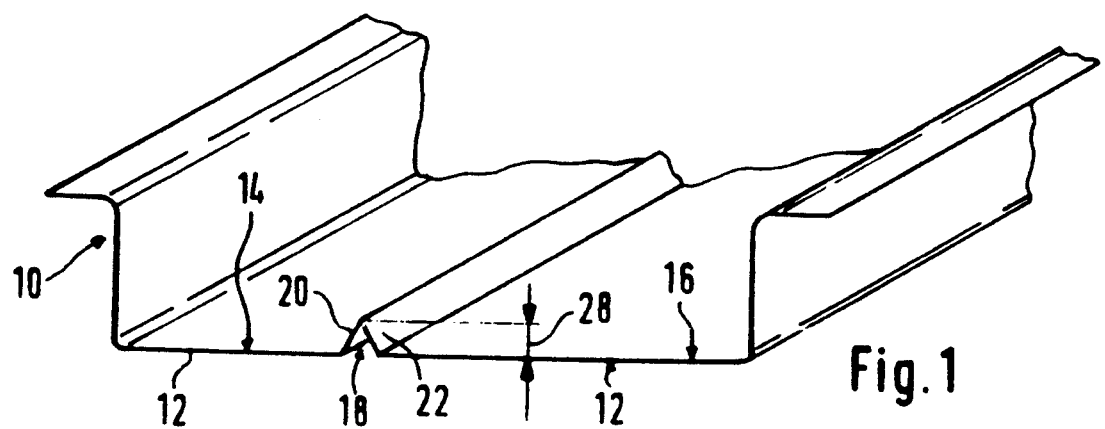
FIGS. 1 to 4 each are schematic cross-sectional views of a mold with a separation fin in the course of different process stages during the production of a two-colored slush skin.

FIG. 1 shows in a schematic cross sectional view a mold 10 for producing a slush skin, two-colored in this case, in accordance with the powder-slush process. The molding face 12 of the mold 10 is divided into two color zones 14 and 16, which are separated from each other by a separation fin 18.

The separation fin 18 is wedge-shaped with two flanks 20 and 22 and has a height indicated by the reference numeral 28. The wedge angle 50 (see FIG. 9) preferably is 45°. As will be explained further down below, the height 28 of the separation fin 18 is slightly greater than the thickness of the slush skin.

To produce a two-colored slush skin, first a one-piece slush skin 24 is formed over the area of the entire mold face 12 and of the two color zones 14 and 16.

For this purpose the mold 10 is coupled with a powder pan, not shown, filled with a first PVC powder of a first color, in a manner known per se from the manufacturing process of the powder-slush process. By means of rotation of the unit formed by the powder pan and the mold 10 the PVC powder comes into contact with the excess PVC powder and is then separated from the mold 10.

Figure 2:
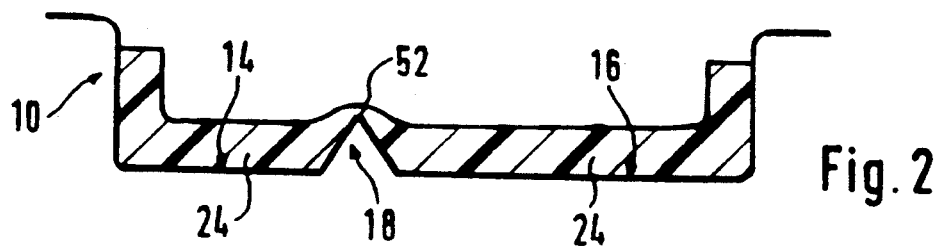

In accordance with the illustration of FIG. 2, the one-piece first slush skin 24 has been formed with a slight rise 52 above the separation fin 18 after the powder adhering to the mold face 12 has been sintered together.

Figure 3:
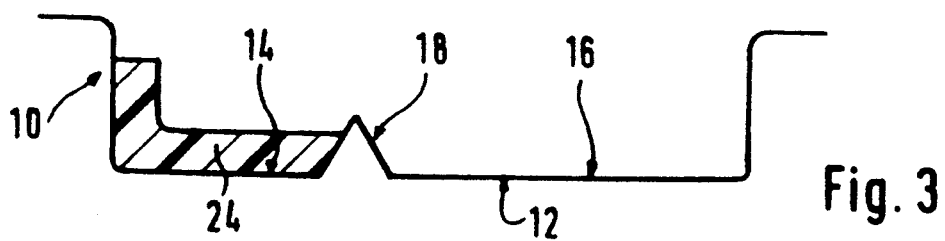

Now the first slush skin is cut off in the area of the separation fin 18, and the skin part connected with the right color zone 16 is taken out of the mold, while a part of the first slush skin 24 remains on the left in the area of the color zone 14. The illustration according to FIG. 3 corresponds to this state.

Figure 4:
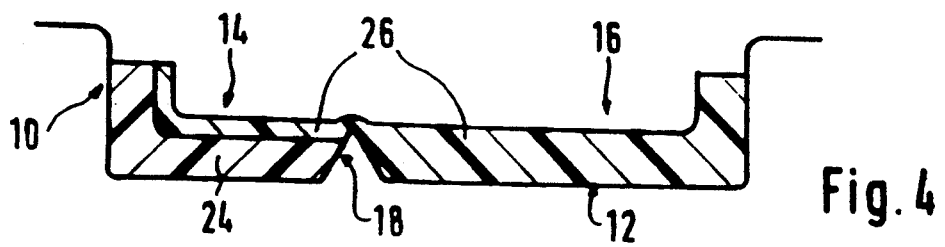

A second slush skin 26 is produced, using another PVC powder of another color, in the manner described above in accordance with the powder-slush process in the next process step, so that the state shown in FIG. 4 results. As can be seen, the second slush skin 26 forms in the normal manner in the area of the right color zone 16. The respective PVC powder naturally also reaches the first slush skin 24, which had remained in the color zone 14 of the mold, when the second slush skin 26 is produced. However, only a very thin second slush skin 26 is formed here. The temperature on the back of the first slush skin 24 is less than the temperature in the area of the right color zone 16. For this reason only a small portion of the PVC powder of the slush skin 26 is sintered together on the first slush skin 24. Nevertheless, FIG. 4 shows that in the second process step a one-piece second slush skin 26 was produced which, however, has a different skin thickness.

In the described process the first slush skin 24 is heated a second time by the mold 10 in the area of the left color zone 14 when the second slush skin 26 is produced, and subsequently the first slush skin 24 is subjected to another cooling. However, tests have shown that this double treatment has no effect on the first slush skin 24.

Figure 5:
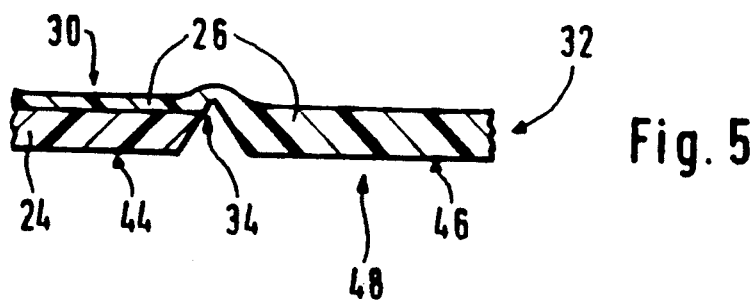
FIG. 5 is a cross-sectional view of a completed two-colored slush skin.

It may be necessary to vary the process parameters of the powder-slush process, namely the rpm of rotation and/or the mold temperature because it is practical, for example, to make the first slush skin 24 thinner than the second slush skin 26 (see FIG. 5).

The combined slush skin in accordance with FIG. 4, consisting of the skin part of the first slush skin 24 and the second slush skin 26, which is connected by its thin part in the left area of the color zone 14 with the first slush skin 24, is taken out of the mold after cooling.

Now the slush skin illustrated in cross section in FIG. 5 is available which, from the grain side 48, presents itself as a two-colored slush skin 32.

Looking from the grain side 48, the two-colored slush skin 32 has two different color areas 44 and 46 which are delimited from each other by a separating seam 34. The separating seam 34 is a result of the separation fin 18. As has been shown in the course of practical tests, this separating seam 34 is of very clean appearance and gives the viewer an unspoiled image of the two-colored slush skin 32.

Incidentally, the separating seam 34 can be designed relatively small and inconspicuous and has an exact course corresponding to the disposition of the separation fin 18.

The two-colored slush skin 32 provides a monochrome appearance from its back opposite the grain side 48, of course, because the last formed slush skin 26 has been produced over the entire area of the mold face 12. It is recommended to choose the skin thickness of the second slush skin 26 greater than the skin thickness of the first slush skin 24, where the skin thickness of the completed two-colored slush skin 32 is then determined by the thickness of the second slush skin 26 in the area 32. This is due to the fact that the second slush skin 26 extends with reduced thickness in the area 30 (i.e. the area of the previously produced first slush skin 24).

Figure 6:
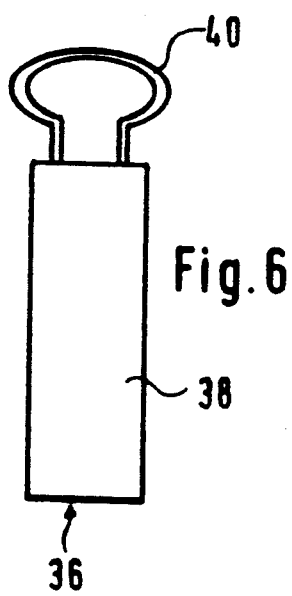
FIGS. 6 and 7 are different views of a separating device with a separating cutter.
Figure 7:
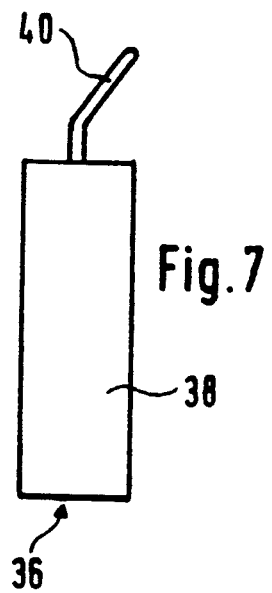

FIGS. 6 and 7 show in a front view and a lateral view a separating device which is used after the production of a first slush skin to separate parts of its skin along the separation fins 18, so that the cut-off parts can be taken out of the mold subsequently.

The separating device 36 consists of a handle 38 and the actual separating cutter 40, which extends in the shape of an arc. The separating cutter 40 can be heated, comparable to a soldering iron.

Figure 8:
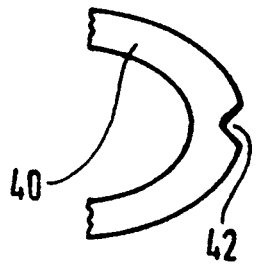
FIG. 8 is an enlarged partial view of the arc-shaped area of the separating cutter.

In accordance with the detailed view of FIG. 8, the separating cutter has a guide groove 42 in its arc-shaped section. The groove has such a shape that it approximately corresponds to the cross-sectional shape of the separation fin 18.

Figure 9:
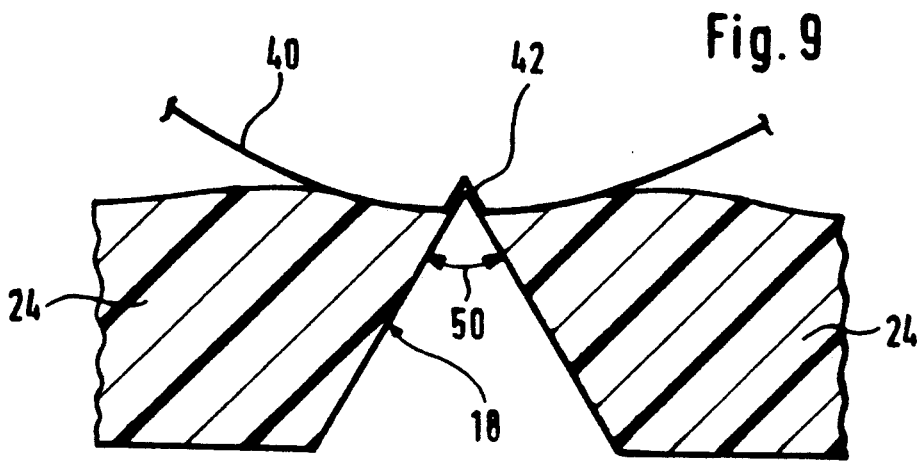
FIG. 9 is a cross-sectional view of a separating cutter and a separation fin.

FIG. 9 illustrates the manipulation of the separating device 36 with separating cutter 40. The heated separating cutter is placed with its groove in the area of the separation fin 18. Because the separating cutter 40 is heated, the first slush skin 24 melts in this area. The separating cutter 40 is then manually moved along the separation fin 18, the guide groove 42 assuring secure guidance and secure motion. The skin portions on both sides of the separating fin 18 are cut off cleanly and exactly because of melting of the slush skin 24 in the area of the upper point of the separation fin 18 as well as by the mechanical movement of the separating cutter 40 along the separation fin 18.

The invention is not limited to the powder-slush process described by way of example above, but can be basically employed with slush processes in general. The invention can be used in particular in connection with the liquid-slush process where it is known to use a paste instead of a powder.

What is claimed is:

1. A process for producing multicolored slush skins comprising the steps of:
   (A) placing a colored slush material selected from a predetermined number of colored slush materials into a mold having a form face, the form face having a plurality of color zones separated by separation fins having acutely tapering flanks which form a wedge angle of approximately 45° with each other, the flanks being symmetrically inclined to an adjacent area of the form face of the mold;

(B) rotating the mold to distribute and deposit the colored slush material on the form face including on the plurality of color zones and on the separation fins;

(C) sintering and gelling the colored slush material;

(D) removing from the mold the sintered and gelled colored slush material from at least one color zone to expose the form face by cutting the sintered and gelled colored slush material at a top edge of the separation fins by moving a separating device with a heated separating cutter on and along the top edge of the separation fins;

(E) placing another colored slush material selected from the predetermined number of colored slush materials into the mold;

(F) repeating steps (B) and (C) to obtain a multi-colored slush skin;

(G) optionally repeating steps (D), (E), and (F) to obtain a multicolored slush skin with a desired number of colors; and (H) removing the multicolored slush skin from the mold.

2. A process in accordance with claim 1, wherein a thickness of the colored slush material placed according to step (A) is selected to be less than a height of the separation fins.

3. A process in accordance with claim 1, wherein PVC powder is used for the colored slush materials.

4. A process in accordance with claim 1, wherein the separation fins are triangular pointed separation fins.

* * * * *